(12) United States Patent
McMahon

(10) Patent No.: US 6,501,443 B1
(45) Date of Patent: Dec. 31, 2002

(54) METHOD OF CONTROLLING LIQUID CRYSTAL LENS IN SOLAR POWERED SPECTACLES USING LIGHT SENSORS

(75) Inventor: Richard Anthony McMahon, Cambridge (GB)

(73) Assignee: Crystalens Limited, Cambridge (GB)

( * ) Notice: Subject to any disclaimer, the term of this patent is extended or adjusted under 35 U.S.C. 154(b) by 0 days.

(21) Appl. No.: 09/489,670

(22) Filed: Jan. 24, 2000

Related U.S. Application Data

(63) Continuation of application No. 08/335,716, filed as application No. PCT/GB93/01156 on Jun. 1, 1993, now abandoned.

(30) Foreign Application Priority Data

May 29, 1992 (GB) ............................................. 9211427

(51) Int. Cl.⁷ ........................ G09G 3/18; G02F 1/1335; G02C 7/10
(52) U.S. Cl. ............................ 345/52; 349/13; 349/14; 351/44
(58) Field of Search ........................ 345/87, 94, 89, 345/204, 208, 207, 147, 148; 349/13, 14, 18, 25, 184; 250/205; 351/41, 44

(56) References Cited

U.S. PATENT DOCUMENTS

| | | | | |
|---|---|---|---|---|
| 4,242,679 A | * | 12/1980 | Morozumi et al. ............ 359/85 |
| 4,279,474 A | * | 7/1981 | Belgorod ...................... 359/85 |
| 4,342,906 A | * | 8/1982 | Hyatt .......................... 250/205 |
| 4,385,294 A | * | 5/1983 | Miles .......................... 345/94 |
| 4,743,096 A | * | 5/1988 | Wakai et al. .................. 345/94 |
| 4,759,608 A | * | 7/1988 | Yang ........................... 349/14 |
| 4,848,877 A | * | 7/1989 | Miller ......................... 359/48 |
| 4,848,890 A | * | 7/1989 | Horn ........................... 351/44 |
| 4,863,244 A | * | 9/1989 | Fuerthbauer et al. ......... 349/14 |
| 4,919,520 A | * | 4/1990 | Okada et al. ................. 349/13 |
| 4,920,257 A | * | 4/1990 | Fuerthbauer et al. ....... 250/205 |
| 4,967,268 A | * | 10/1990 | Lipton et al. |
| 4,968,127 A | * | 11/1990 | Russell et al. ................ 351/44 |
| 5,015,086 A | * | 5/1991 | Okaue et al. ................ 359/36 |
| 5,067,795 A | * | 11/1991 | Senatore ..................... 349/14 |
| 5,074,647 A | * | 12/1991 | Fergason et al. ............. 349/14 |
| 5,114,218 A | * | 5/1992 | Black et al. .................. 351/44 |
| 5,122,783 A | * | 6/1992 | Bassetti, Jr. ................ 345/147 |
| 5,170,271 A | * | 12/1992 | Lackner et al. ............... 359/84 |
| 5,172,256 A | * | 12/1992 | Sethofer et al. .............. 359/85 |
| 5,208,688 A | * | 5/1993 | Fergason et al. ............. 349/14 |
| 5,247,378 A | * | 9/1993 | Miller ......................... 359/84 |
| 5,252,817 A | * | 10/1993 | Fergason et al. ............ 250/205 |
| 5,276,539 A | * | 1/1994 | Humphrey .................... 359/85 |
| 5,293,159 A | * | 3/1994 | Bassetti, Jr. et al. ........ 345/147 |
| 5,414,546 A | * | 5/1995 | Fergason ..................... 349/18 |
| 5,459,495 A | * | 10/1995 | Scheffer et al. ............. 345/147 |

FOREIGN PATENT DOCUMENTS

| | | | | |
|---|---|---|---|---|
| JP | 403155520 A | * | 7/1991 | ............ G02C/7/12 |
| JP | 403163413 A | * | 7/1991 | ............ G02C/7/10 |

OTHER PUBLICATIONS

H. Seki et al. "Electro–Optical Liquid–Crystal Light–Control Valve Incorp a Solar Battery" Pro of The SID vol. 32 No. 3 1991.*

* cited by examiner

*Primary Examiner*—Steven Saras
*Assistant Examiner*—Paul A. Bell
(74) *Attorney, Agent, or Firm*—Birch, Stewart, Kolasch & Birch, LLP

(57) ABSTRACT

In a pair of spectacles using liquid crystal lenses, an electrical circuit, for controlling the optical transmission of the liquid crystal lenses, controls the amplitude and/or duty cycle of the voltage driving the lens so as to operate the liquid crystal lens in the transition region, between maximum and minimum optical densities.

11 Claims, 9 Drawing Sheets

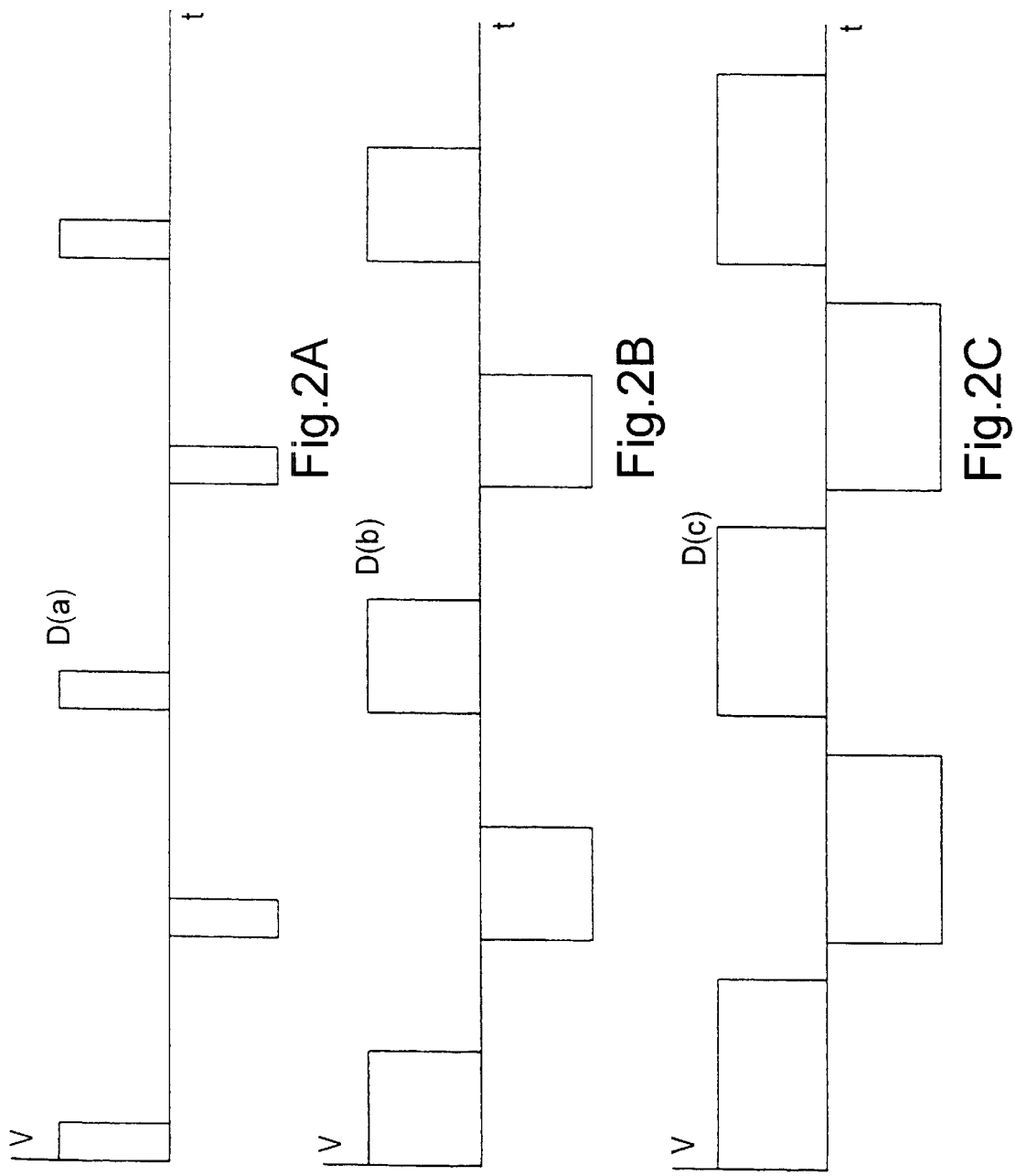

METHOD OF CONTROLLING LIQUID CRYSTAL LENS IN SOLAR POWERED SPECTACLES USING LIGHT SENSORS

This application is a Continuation of Application Ser. No. 08/335,716 filed on Nov. 10, 1994, now abandoned, which is a National Phase of International Application No. PCT/GB93/01156 filed on Jun. 1, 1993 now abandoned.

FIELD OF THE INVENTION

The present invention relates generally to variable optical density lenses and in particular to liquid crystal lenses in which the optical density is varied as a function of ambient light intensity.

DESCRIPTION OF THE BACKGROUND ART

One type of liquid crystal spectacle lens with a rapid response to changes in ambient light is described in U.S. Pat. No. 4,279,474 and another is disclosed in our International patent application, PCT/GB 93/00119, in which we describe an electrical circuit for controlling the duty cycle of a waveform for driving a liquid crystal lens in dependence upon ambient light levels, in order to adjust the amount of light transmitted through the lens, the circuit including means for adjusting the response time of the circuit to changes in ambient light. That invention consists of a means for varying the rate at which the duty cycle and hence the optical density changes in response to changes in ambient light, and, in addition, comprises an arrangement for setting the threshold at which darkening starts and a means for obtaining a desired darkening characteristic above the threshold.

However, practical difficulties arise in implementing the method proposed in U.S. Pat. No. 4,279,474 for two inter-related reasons, namely user comfort and the unavailability of suitable liquid crystal cells. The operating principle outlined in U.S. Pat. No. 4,279,474 involves operating the liquid crystal cell in one of two states, a state of maximum transmission and a state of minimum transmission. The average value of the transmission depends on the proportions of time spent in the two states. It was argued in U.S. Pat. No. 4,279,474 that provided the switching frequency of the liquid crystal cell exceeded a certain value, known as the critical flicker fusion frequency, the wearer would perceive the average value of transmitted light. The critical flicker fusion frequency varies with light level according to the Ferry-Porter law and varies from 10 to 45 Hz over the range of light levels of interest in U.S. Pat. No. 4,279,474.

Human sensitivity to flicker has been studied in detail (see *Lighting and Research Technology* 6, (1974) 127, G W Brundrett). Brundrett reports that the critical flicker frequency also depends on the amplitude of the flicker compared to the mean light level. Sensitivity to flicker above the critical flicker fusion frequency was noted and led to headaches, dizziness and other side effects. The sensitivity of humans to flicker, based on electroretinogram data, has also been measured (see *Abstracts of the Annual Meeting of the Association for Research in Vision and Opthalmology,* 1988,Vol.29 D S Greenhouse, S M Berman, I L Bailey, & T Raasch). Although the study indicates that there was still a measurable retinal response at 200 Hz, it was less than one thousandth of the response at the critical flicker fusion frequency. Therefore, to avoid undesirable side-effects, when using the method employed in U.S. Pat. No. 4,279,474, the switching frequency should be at least 200 Hz.

To implement this approach with a switching frequency of 200 Hz, the switching time of the cell needs to be short compared to the times in the two transmission states—a switching time of 20% of the minimum time in a state could be taken as a guide. The minimum time in a state will be the time in the state of minimum transmission when the liquid crystal cell is giving its highest average transmission, or the time in the state of maximum transmission when the liquid crystal cell is giving its lowest average transmission. A ratio of average values of transmission of 4:1 could be achieved by varying the proportions of time in the state of maximum and minimum transmissions from 1:4 to 4:1 and would give a minimum transmission similar to that found in conventional sunglasses of fixed transmission. At a switching frequency of 200 Hz that corresponds to a minimum time in a state of 1 ms. Therefore a cell switching time of less than 200 $\mu$s is needed.

However, nematic cells of the type proposed in U.S. Pat No. 4,279,474 have minimum switching times of about 10 ms and could not therefore be used. An alternative is the use of ferroelectric cells, which exhibit switching times of 100 $\mu$s or less but have practical disadvantages. Ferroelectric cells are, at present, not sufficiently robust for use in sunglasses and suffer irreversible damage if squeezed. The thickness of the liquid crystal is usually less than that in nematic cells, and needs to be more precisely controlled, making the manufacture of ferroelectric cells more difficult. In addition, a higher drive voltage is needed, up to 15V compared to the 5V used for nematic cells and to achieve effective operation a complex drive waveform is often employed. The generation of this kind of waveform is unattractive in solar powered eyewear, where it is desirable to use the minimum power at a low voltage to minimize the size of the solar cell array.

SUMMARY OF THE INVENTION

Accordingly, there is a need for another method of operating liquid crystal lenses, particularly of the nematic type, which alleviates the problems of flicker.

According to the present invention there is provided a liquid crystal lens device having an electrical circuit comprising means for detecting the ambient light level, and means for controllably varying the optical transmission of the liquid crystal lens dependent on said ambient light level, characterised by means for controlling the duty cycle of the voltage driving the lens so as to cause the liquid crystal lens to operate in the transition region, between maximum and minimum optical densities.

Preferably, the RMS value of the pulse voltage is controlled so as to be arranged to remain between the threshold values of the liquid crystal lens.

Advantages of this method of operation are that a cell with slow response characteristics can be used and that flicker in the transmitted light at the driving frequency is very small. This thus avoids problems inherent in driving cells between states of maximum and minimum light transmission.

The transmission of a nematic liquid crystal cell depends on the root mean square (RMS) of the applied voltage over a wide range of voltage waveforms. In the case of a rectangular waveform (which is convenient to generate), the RMS and hence the transmission, will depend on the amplitude of the waveform and the square root of the duty cycle, at least for duty cycles of a few percent or greater.

The approach of varying the RMS by changing the amplitude, but maintaining an essentially constant duty cycle, has been exploited in sunglasses using LC cells as lenses (see H.Seki, Y.Masuda and Y.Itoh, *Proc.Soc. for*

Information Display 32-3(1991) pp191-195). A serious drawback with this approach is that nematic LC cells show a rapid change in transmission over a small range of RMS voltage, demanding sensitive and stable control of the amplitude of the applied waveform, on which the RMS depends directly. In consequence, where the amplitude is determined by a supply voltage susceptible to change, as in solar powered spectacles, the resulting darkening characteristic is unlikely to be near the optimum. Although improvement would be possible by including circuitry, typically an analogue amplifier, to vary precisely the amplitude of the drive waveform, it is not practical to include analogue circuits in the type of low power consumption application specific integrated circuits (ASICs) that are desirable for solar powered sunglasses.

There are several advantages in the design and operation of the drive circuitry for LC lenses when the duty cycle of the drive waveform is varied. The RMS of the waveform is a function of the square root of the duty cycle, permitting a more gradual variation of RMS value and hence cell transmission. Avoiding the need to vary the amplitude of the drive waveform allows the design of a simpler drive circuit, using standard digital CMOS techniques. Such circuits can be readily incorporated into low power ASICs, which are advantageous in minimizing the power requirements of the system to enable the specification of a small and unobtrusive solar cell as the power source. To avoid unwanted changes in the RMS value of the drive waveform where the supply voltage varies, as it would in solar powered sunglasses, a simple voltage regulator can be employed. Alternatively, the amplitude could be allowed to change with supply voltage and the duty cycle compensated to maintain the RMS vale of the waveform constant.

The control of flicker in the transmitted light is important to avoid unpleasant visual effects for the wearer and in order to minimize the risk of headaches and other effects. The amplitude and frequency components of the waveform of the flicker in transmitted light depend on the time-response characteristic of the LC cell, the nature of the drive waveform and the local gradient of the transmission against RMS voltage characteristic. All other things being equal, the slower the response of the LC cell, the smaller the flicker in transmitted light. For a given LC cell, the most favourable condition with a rectangular drive waveform is a 50% duty cycle, but this will not be maintained in a system where the duty cycle is varied to alter the transmission of the LC cell. For a waveform of constant period, the flicker will grow as the time between the high to low and low to high transition increases with reducing duty cycle. An improvement is to divide the time for which the drive is high into several shorter pulses, whilst maintaining the same RMS value for the waveform. An alternative solution is to reduce the period of the drive waveform, i.e. increase its frequency, as the duty cycle falls. If the time for which the drive waveform is low does not change with duty cycle, the flicker will be reduced. A penalty with both techniques is that the number of transitions per second would increase, requiring more power to charge and discharge the capacitance of the LC cell.

It is presently proposed to employ conventional nematic cells with the circuit of the invention.

BRIEF DESCRIPTION OF THE DRAWINGS

Examples of devices according to the present invention will now be described with reference to the accompanying drawings, which are given by way of illustration only, and thus are not limitative of the present invention, and in which:

FIGS. 2(a) to 2(c) are diagrams showing waveforms used in operation of the lens.

DETAILED DESCRIPTION OF THE PREFERRED EMBODIMENT

Figure 1A:
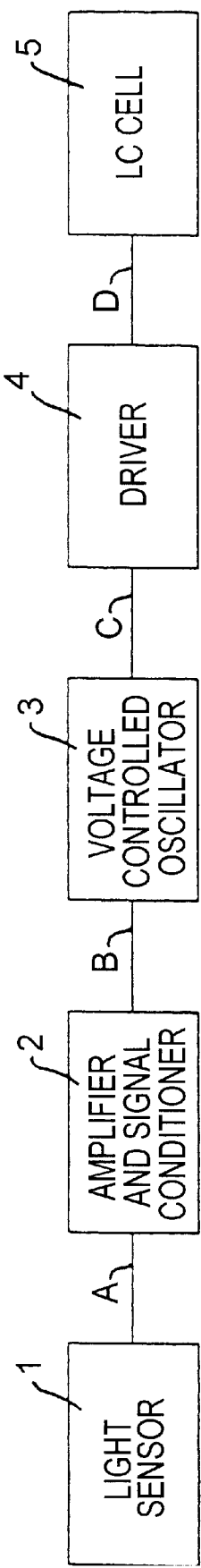
FIG. 1A is a simplified block diagram of a circuit for controlling the optical density of a lens.
Figure 1B:
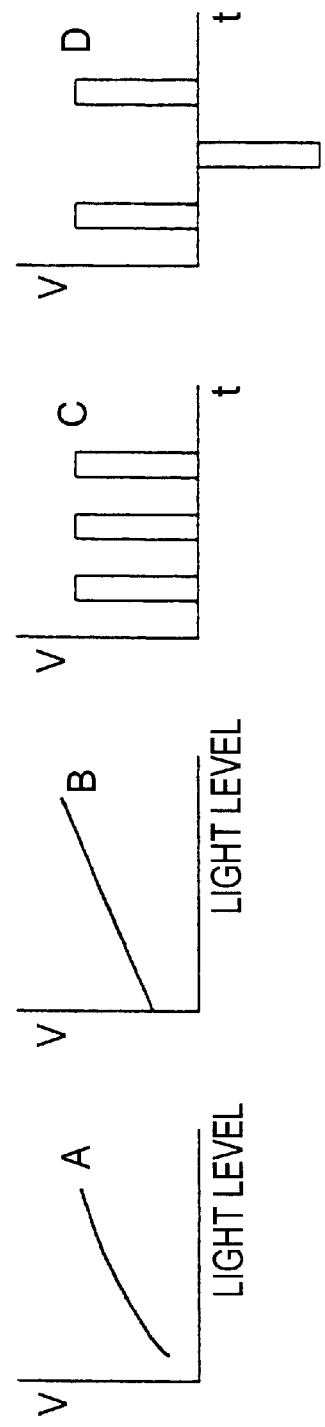
FIG. 1B shows associated waveforms.

The circuit shown in FIG. 1 is a simplified block diagram of a circuit for controlling the optical density of a lens in response to changes in ambient light. The circuit can be implemented using analogue or digital circuit techniques, or a mixture of these. Preferably, the whole circuit will be provided on one application specific integrated circuit (ASIC) in order to keep manufacturing costs to appropriate levels, for size requirements and to minimize overall power consumption. A largely digital implementation is likely to be preferred.

Figure 5:
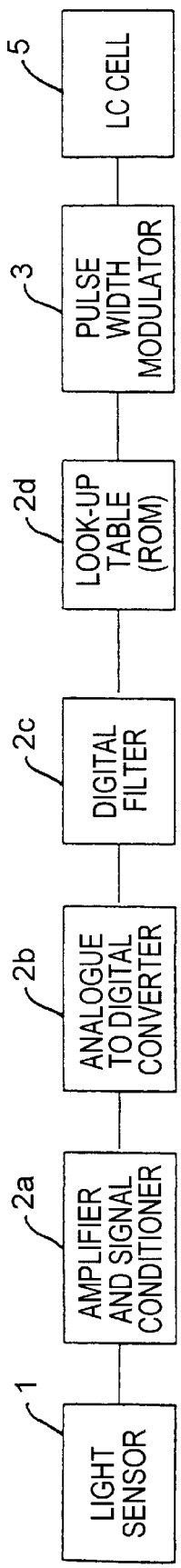
FIG. 5 is a simplified block diagram of a third circuit for implementing the present invention.
Figure 6:
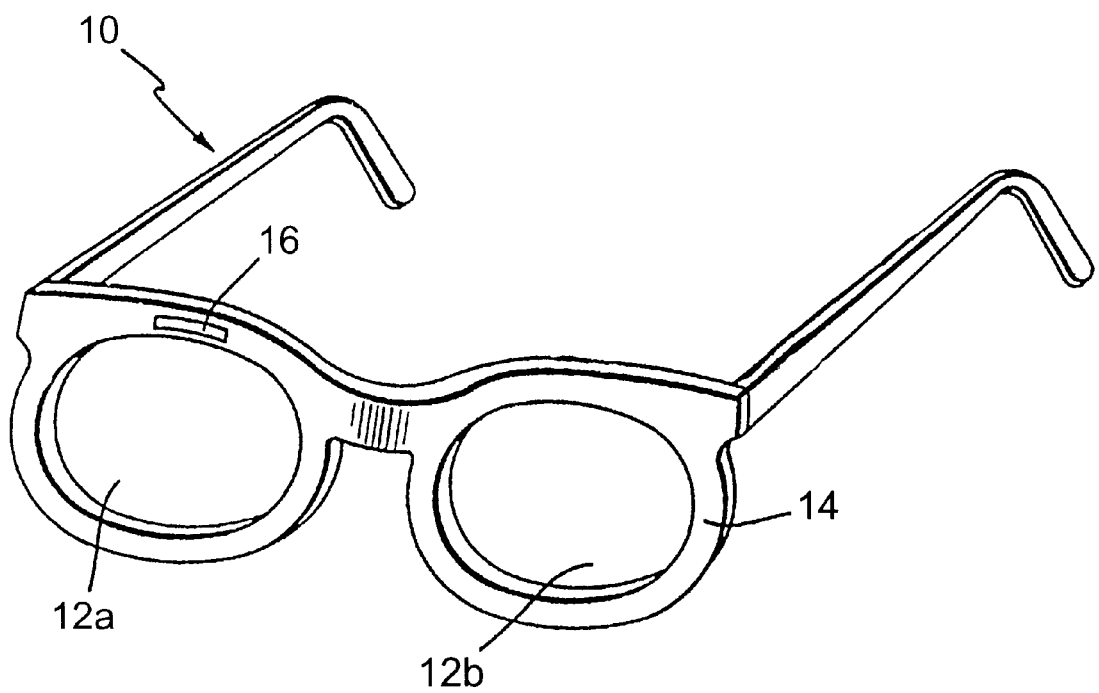
FIG. 6 is a drawing showing spectables and a solar cell power supply.

Referring to FIG. 1, the circuit includes a detector 1 which may be a photodiode or other photosensitive device. The particular sensor chosen will depend on ease of fitting in the spectacle frames and cost, as well as its response characteristics. A generic pair of spectacles 10 is shown in FIG. 6. It should be appreciated that the concepts of the present invention can be applied to many different styles of spectacles. The spectacles 10 include a frame 14, a solar cell power supply 16 and lenses 12a, 12b. The location of this solar cell power supply 16 can, of course, be varied. The output A from the detector 1 is fed to a signal conditioning stage 2. In a digital implementation, analogue-to-digital conversion would be performed at this stage; the signal would be pre-processed before conversion, for example by taking its logarithm to produce a convenient output as a function of light level, taking into account the properties of the light detector and the desired response characteristic of the sunglasses. FIG. 5 illustrates such a digital circuit (see further below). In an analogue version, similar functions would be performed. However, a time constant setting circuit and circuits to allow adjustments to the threshold of darkening and the form of darkening characteristic would be included.

In the digital implementation (see FIG. 5) a pulse-width modulated signal C (ie one with a variable duty cycle) would be obtained from a digitally controlled pulse generator. An analogue-to-digital converter 2b converts the signal from the amplifier/signal conditioner stage 2a. Time constant control is possible by placing a digital filter 2c in the input to the pulse generator and arbitrary response characteristics can be obtained by using a look-up table (ROM) 2d to translate the output of the digital filter into the appropriate control data for a pulse width modulator 3. In the analogue version, the voltage controlled oscillator taking its input from the signal conditioning stage 2, produces a pulse-width modulated waveform C.

The driver stage 4 produces an output signal at D comprising alternate pulses of equal amplitude, but opposite polarity, of the same duration as at C. Providing pulses of opposite polarity avoids the generation of a DC component across cell 5.

Some liquid crystal cell types darken with increasing voltages and others clear with increasing applied voltage. In the present invention either can be used. The period of the waveform may change with duty cycle, dependent on what type of waveform it is most convenient to generate in a given circumstance. The control of flicker will be an important factor in the choice of waveform. FIGS. 2(a)–(c) show appropriate waveforms D(a)–D(c) of variable duty cycle but constant period.

Figure 4:
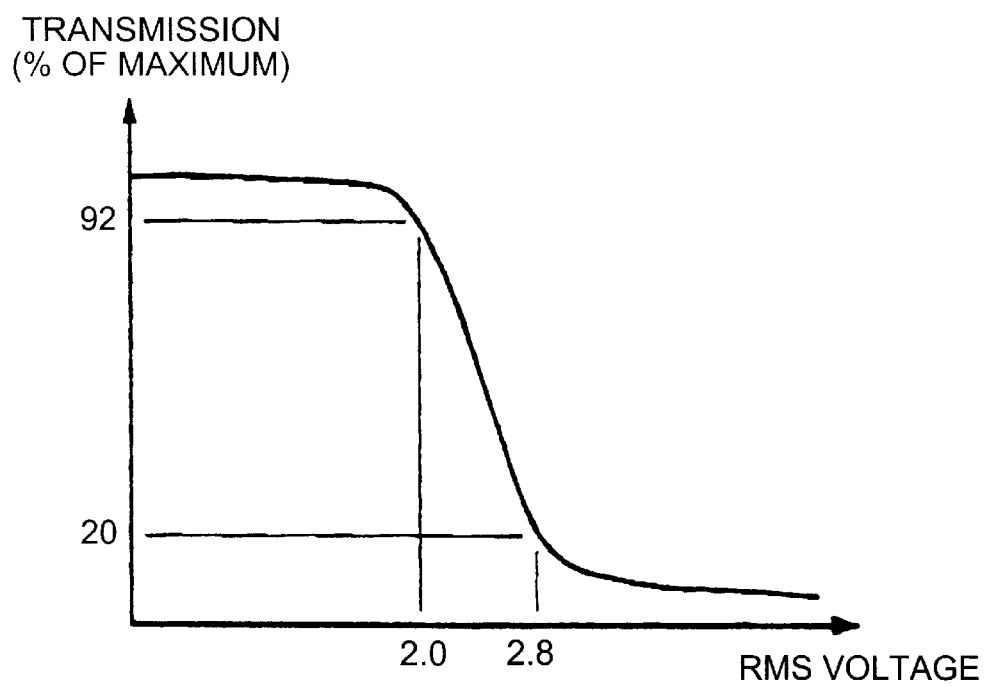
FIG. 4 is a graph showing LCD transmission percentage vs. RMS voltage across the LCD.

FIG. 4 illustrates a typical relationship of percentage of maximum light transmission vs RMS voltage for a nematic LC cell, and shows a range of RMS voltage of 2.0V to 2.8V over which the cell can be operated in accordance with this invention in order to provide an operating characteristic which lies in the transition region of the LCD in between maximum transmission and maximum opacity, in the present case between 20% and 92% maximum light transmission.

In the drive and control circuit shown in FIGS. 3A to 3E a supply voltage $V_s$ is provided on line 104. The light detection and signal conditioning circuit comprises a photodiode 100, operated in the reverse bias mode, a capacitor 101, a diode 102, two transistors 105 and 106 and a resistor 103 which define a current $I_x$ which is proportional to the logarithm of the light level falling on the photodiode. This allows a wide range of light levels to be accommodated and the variable resistance 103 adjusts the sensitivity of the circuit, varying the threshold at which the LC lens starts to change transmission and the rate of change of transmission above the threshold.

The analogue signal is converted into digital form by a circuit block 110. Capacitor 101 charges at a rate determined by the current $I_x$ from an initially discharged state. During conversion a counter 150 counts clock pulses from the master clock 111. When the capacitor voltage reaches the threshold of the Schmitt input inverter 107 the count reached at that point is loaded into latches 114 and 115, but the counter 150 continues to count. At a count of 255 the conversion cycle is stopped and capacitor 101 is discharged by a transistor 130, driven by a pulse formed by resistor capacitor network 131, on a positive going edge on the Schmitt inverter 132. This approach ensures that the conversion rate is constant, even though the voltage on the capacitor 101 reaches the threshold value at different times depending on the light level.

The data stored on latches 114 and 115 is transferred to latches 116 and 117 at the end of conversion under the control of a timing pulse from circuit block 110. This ensures that the binary number representing light level only changes at the end of the conversion cycle and not at the point at which the count representing the light level is loaded into the data latches.

The output from the latches 116 and 117 is sent to a circuit block 151 which sets the time response of the system. The output from this circuit block is a binary number which controls a pulse width modulator comprising magnitude comparators 123 and 124. The "current" value output to the pulse width modulator is stored on the two up/down counters 120 and 121. This "current" value of output is compared with the binary number, from latches 116 and 117 representing light level, by magnitude comparators 118 and 119. If the "current" value of output is less than the most recent value of input, the up/down counters 120 and 121 will be set to count up and vice versa. The rate of change in output depends on the number of pulses allowed through the gating circuit 133. The number of pulses varies with the "Any bit" line 128 selected, from 256 per conversion cycle (bit 0) to one every eight cycles (bit 11), in multiples of 2. The greater the number of pulses admitted per cycle, the faster the change in output towards the input and the time constant of the circuit would thereby be shorter.

The pulse width modulation is achieved by magnitude comparators 123 and 124. The desired pulse width is loaded into the "A" inputs, and the output from the counter 150 goes to the "B" inputs. The output stays low until the output of the counter 150 exceeds the value at the "A" input. A bipolar output signal for the LC lenses is obtained with circuit block 125, comprising a J-K flip-flop 126 and NAND gates 127.

Since, for a given LC cell it is known where the threshold voltage is above which the cell begins to darken (see FIG. 4), the adjustment resistor 103 is set appropriately so that the logarithmically scaled current $I_x$ is generated by the signal conditioning circuit at an appropriate value such that the RMS voltage produced by the control circuit is above the threshold. Because the current $I_x$ is generated in accordance with the logarithm of the incident light, the system can be adjusted to provide an acceptable response, so that any normally available light level will not cause an RMS voltage value to be generated which is beyond the upper limit point at which the LC cell begins to stop changing transmissivity again, ie the cell fails to darken further substantially. Using a look-up table the desired response characteristic, in so far as both threshold response and darkening characteristic are concerned, can be obtained. This could be implemented, as shown in FIG. 5, by inserting a ROM (read-only-memory) 2d between the digital filter 2c and the pulse wave modulator 3. The look-up table would take a binary number representing light level to give the desired binary output control signal to the pulse wave modulator in order to provide the required cell transmission.

Figure 3A:
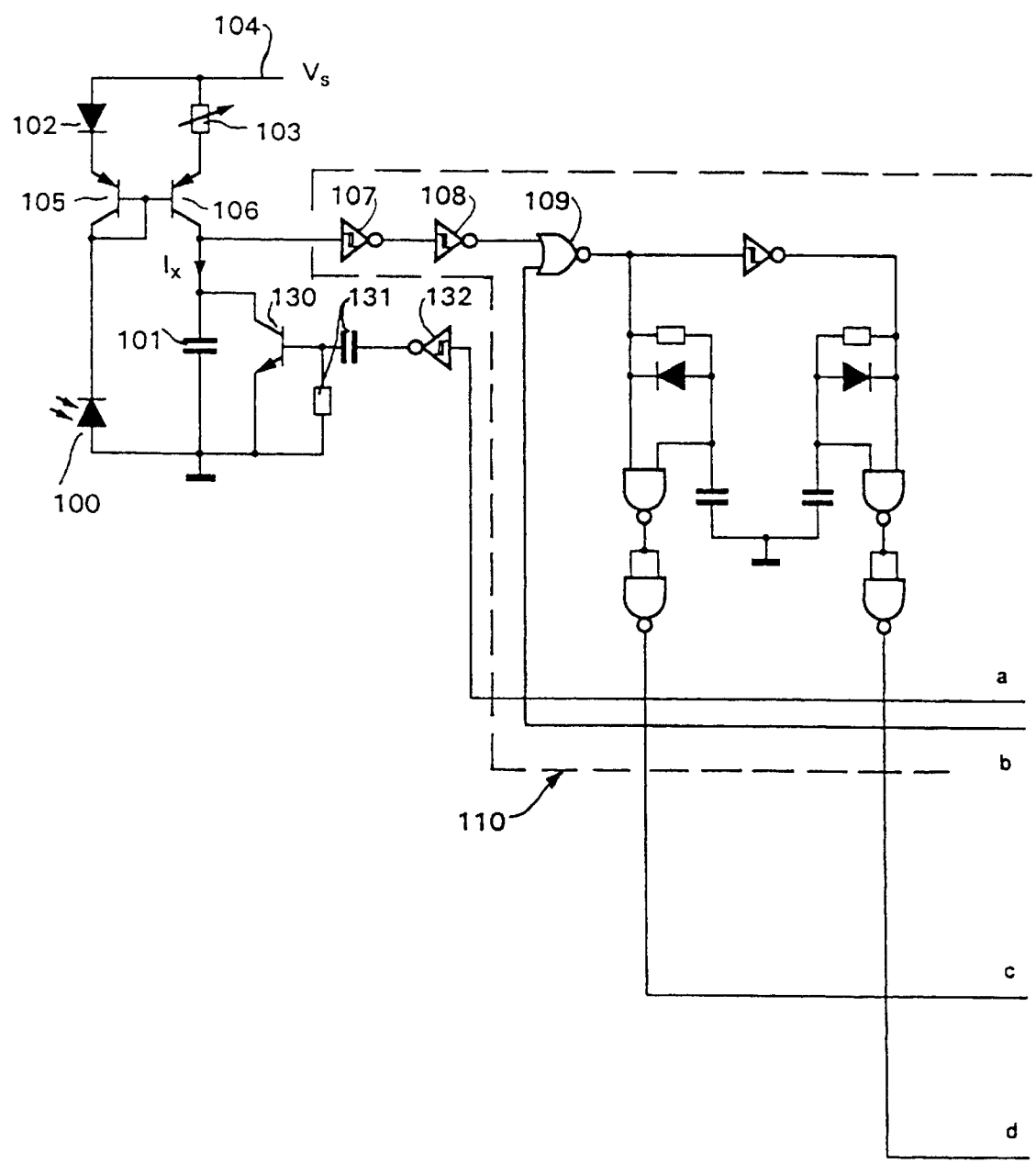
FIGS. 3A to 3E a circuit diagrams of a further control circuit for implementing the technique of the invention.
Figure 3B:
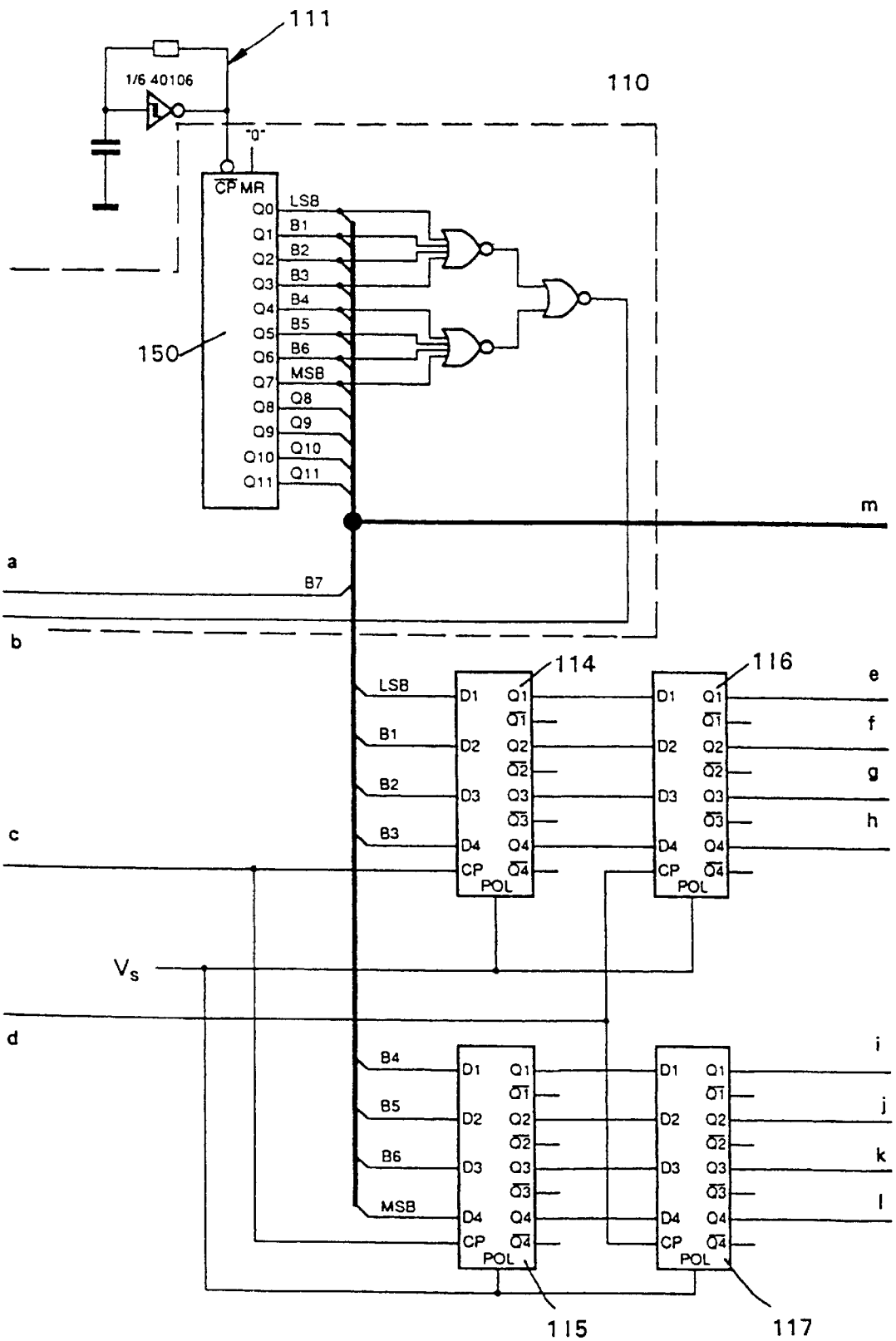
Figure 3C:
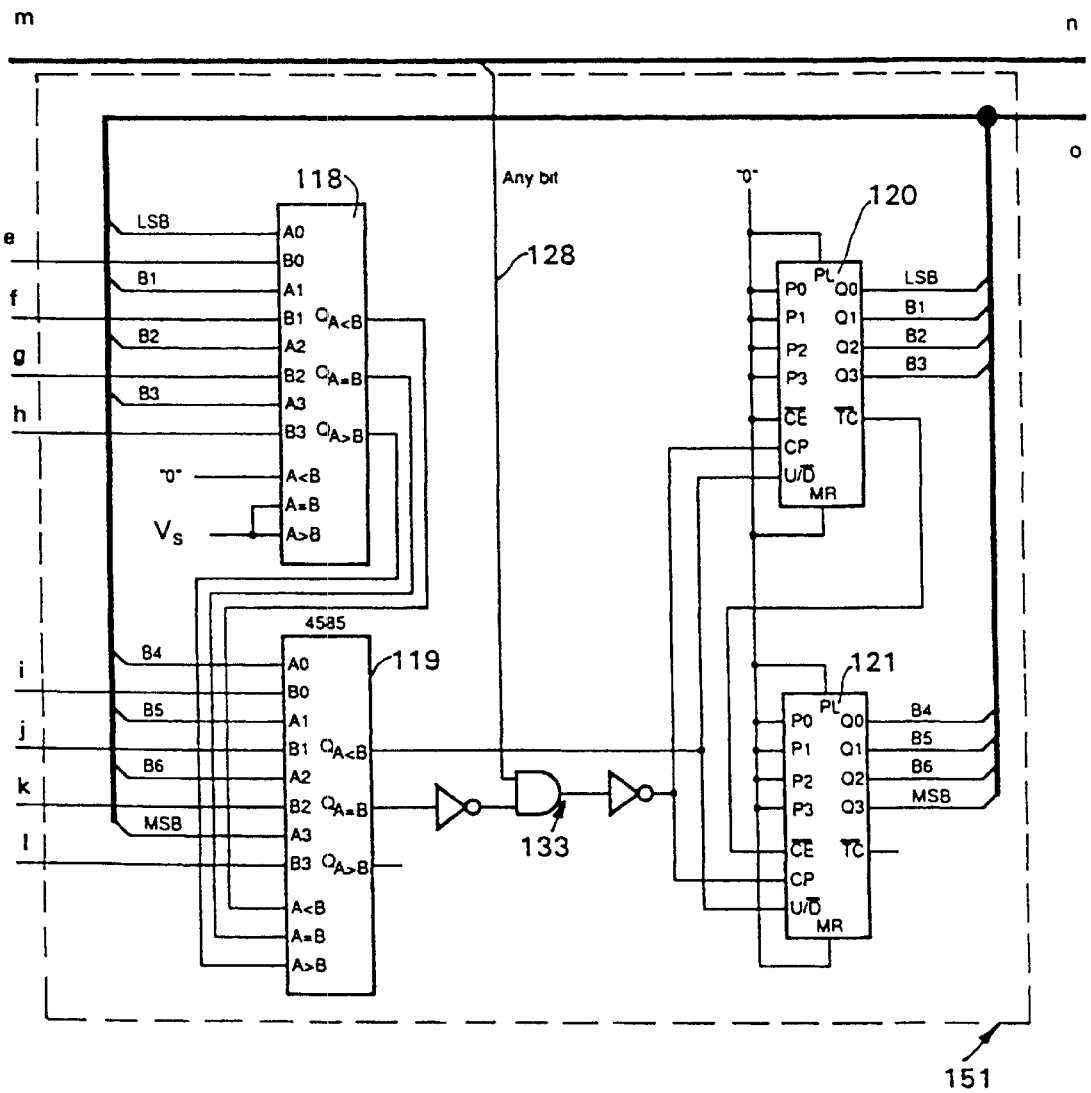
Figure 3D:
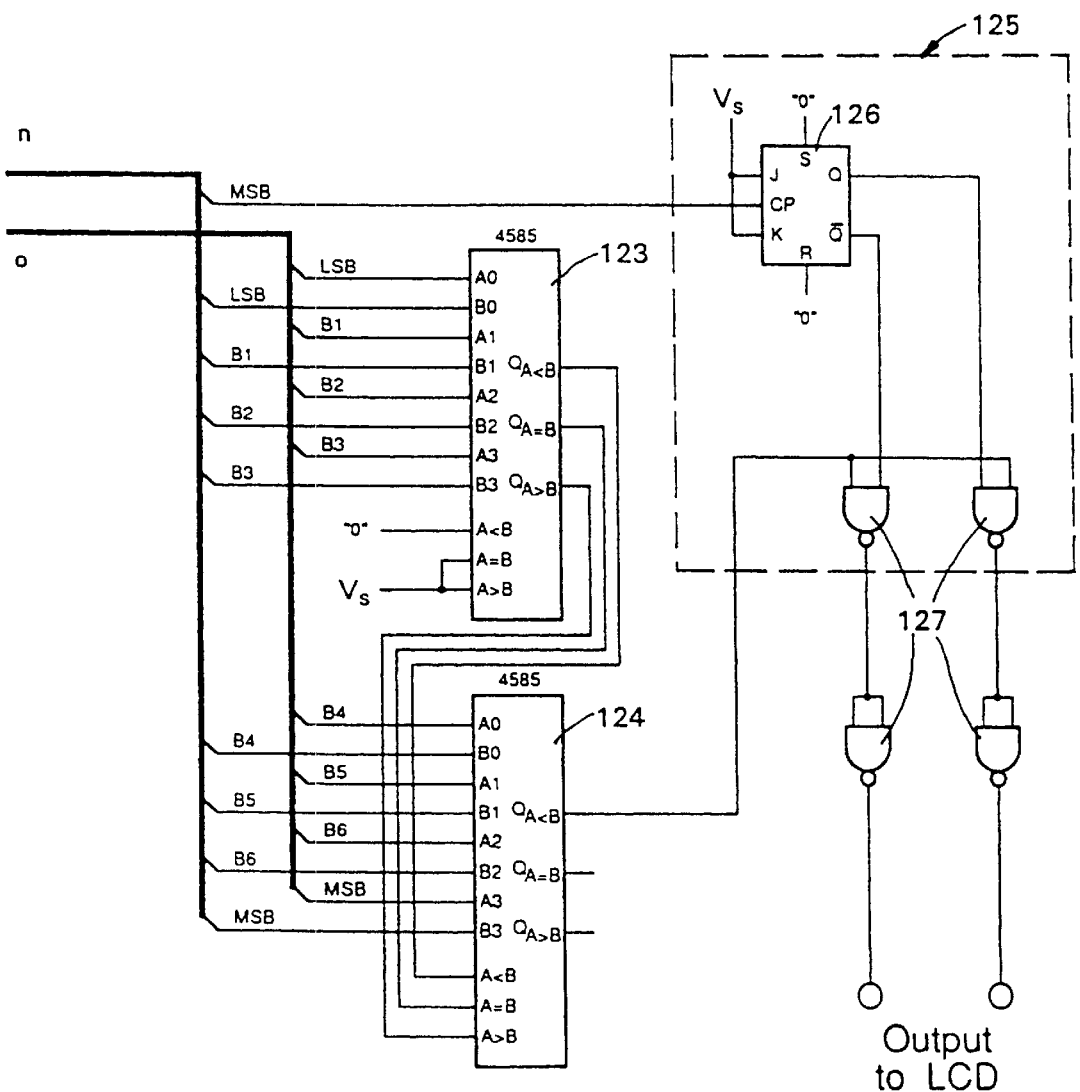
Figure 3E:
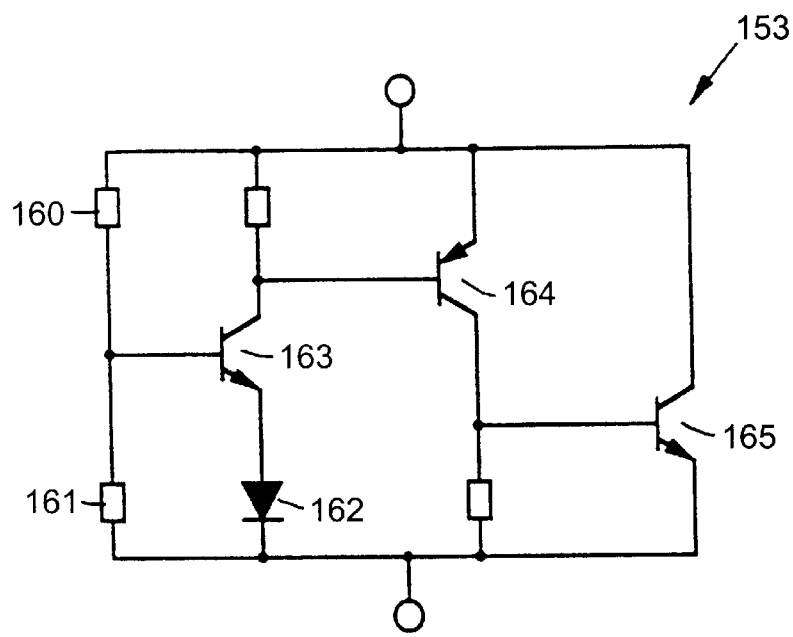

As the LC cells responds to the RMS value of the drive waveform, which depends on the amplitude as well as the duty cycle of that waveform, it is necessary to provide some means of avoiding unwanted changes in RMS as a result of fluctuations in amplitude. The most important cause of fluctuations is changes in supply voltage, and these will occur in a solar powered device. The shunt regulator 153 shown in FIG. 3E is used to stabilize the supply voltages to the circuit of FIGS. 3A to 3D. The operation of the circuit is known to those familiar with voltage regulators. A divided fraction of the supply voltagevs, from resistors 160 and 161, is compared to a reference voltage across diode 162. If the supply voltage rises, the currents through transistors 163, 164 and 165 increase. The increase in current drawn by the circuit will be enough to pull down the supply voltage if it is derived from a source of appreciable internal impedance, such as an array of solar cells.

The invention being thus described, it will be obvious that the same nay be varied in many ways. Such variations are not to be regarded as a departure from the spirit and scope of the invention, and all such modifications as would be obvious to one skilled in the art are intended to be included within the scope of the following claims.

What is claimed is:

1. A device comprising:
   a liquid crystal lens having an optical density which can vary in response to a voltage of a drive signal applied thereto, wherein when the voltage of the drive signal applied thereto is less than a first threshold value said liquid crystal lens exhibits a substantially uniform minimum optical density, and when the voltage of the drive signal applied thereto is greater than a second threshold value said liquid crystal lens exhibits a substantially uniform maximum optical density, and wherein when the voltage of the drive signal applied to said liquid crystal lens is between said first and second threshold values said liquid crystal lens operates in a transition region and exhibits an optical density between said minimum and maximum optical densities; and an electrical circuit including:
  means for detecting an ambient light level; and
  means for controllably varying the optical density of said liquid crystal lens dependent on the ambient light level, including means for changing a duty cycle of the drive signal driving said liquid crystal lens, wherein an amplitude of the voltage of the drive signal remains substantially constant between said first and second threshold values as the duty cycle changes, so as to cause said liquid crystal lens to operate in the transition region, between said minimum and maximum optical densities.

2. The device according to claim 1, wherein the drive signal includes a voltage pulse train and wherein a RMS of voltage pulses in the voltage pulse train is controlled by said changing means so as to remain substantially constant between said first and second threshold values.

3. The device according to claim 2, wherein the duty cycle of the drive signal is varied by changing a time duration of the voltage pulses in the voltage pulse train.

4. The device according to claim 2, wherein the duty cycle of the drive signal is varied by changing a period of the voltage pulses in the voltage pulse train.

5. The device according to claim 1, wherein a look-up table is provided in order to enable a binary representation of the ambient light level, provided as an input, to cause a binary output to control the duty cycle of the drive signal.

6. The device according to claim 1, wherein said means for detecting the ambient light level includes a light sensor to produce a first signal, and said electrical circuit further includes means for compressing the first signal logarithmically to produce a second signal logarithmically proportional to the ambient light level.

7. The device according to claim 6, wherein the first signal is an analogue signal and said electrical circuit further includes means for converting said first signal to a digital signal, the value of which is held in a latch to provide an input to a pulse width modulator which provides the drive signal to control said liquid crystal lens.

8. The device according to claim 1, wherein said electrical circuit further includes a solar cell power supply for providing a supply voltage to the electrical circuit and a voltage regulator for regulating the supply voltage to a substantially constant value.

9. The device according claim 1, wherein said electrical circuit further includes means for pre-processing a signal representative of the ambient light level in order to adjust a range of the duty cycle of the drive signal driving said liquid crystal lens.

10. The device according to claim 1, wherein said electrical circuit further includes means for varying the duty cycle of the drive signal to compensate for changes in a supply voltage for said electrical circuit.

11. A pair of spectacles comprising:
  a liquid crystal lens having an optical density which can vary in response to a voltage of a drive signal applied thereto, wherein when the voltage of the drive signal applied thereto is less than a first threshold value said liquid crystal lens exhibits a substantially uniform minimum optical density, and when the voltage of the drive signal applied thereto is greater than a second threshold value said liquid crystal lens exhibits a substantially uniform maximum optical density, and wherein when the voltage of the drive signal applied to said liquid crystal lens is between said first and second threshold values said liquid crystal lens operates in a transition region and exhibits an optical density between said minimum and maximum optical densities; and an electrical circuit including:
  means for detecting an ambient light level; and
  means for controllably varying the optical density of said liquid crystal lens dependent on the ambient light level, including means for changing a duty cycle of the drive signal driving said liquid crystal lens, wherein an amplitude of the voltage of the drive signal remains substantially constant between said first and second threshold values as the duty cycle changes, so as to cause said liquid crystal lens to operate in the transition region, between said minimum and maximum optical densities.

* * * * *